United States Patent
O'Connell et al.

(10) Patent No.: US 9,564,991 B2
(45) Date of Patent: Feb. 7, 2017

(54) ETHERNET POINT TO POINT LINK INCORPORATING FORWARD ERROR CORRECTION

(71) Applicant: Microsemi Frequency and Time Corporation, San Jose, CA (US)

(72) Inventors: Anne Geraldine O'Connell, Cork (IE); Con Cremin, Cork (IE)

(73) Assignee: Microsemi Frequency and Time Corporation, San Jose, CA (US)

( * ) Notice: Subject to any disclaimer, the term of this patent is extended or adjusted under 35 U.S.C. 154(b) by 142 days.

(21) Appl. No.: 14/527,795

(22) Filed: Oct. 30, 2014

(65) Prior Publication Data
US 2015/0135041 A1    May 14, 2015

(30) Foreign Application Priority Data
Nov. 13, 2013 (GB) .................................. 1319995.5

(51) Int. Cl.
*H03M 13/00* (2006.01)
*H04L 1/00* (2006.01)
(Continued)

(52) U.S. Cl.
CPC ............. *H04L 1/0041* (2013.01); *G06F 11/10* (2013.01); *H04L 5/0083* (2013.01); *H04L 1/0057* (2013.01)

(58) Field of Classification Search
CPC ...... H04L 1/0041; H04L 1/0083; H04L 1/004; H04L 5/0083; G06F 11/10
See application file for complete search history.

(56) References Cited

U.S. PATENT DOCUMENTS 6,728,216 B1 * 4/2004 Sterner ................. H04L 1/0002
370/252
7,869,343 B1    1/2011 Xue
(Continued)

FOREIGN PATENT DOCUMENTS

EP    0865178 A2    9/1998
EP    2395727 A1    12/2011
(Continued)

OTHER PUBLICATIONS

Jiang, G.; Liu, D., "Analysis and Implementation of FEC in 10G-EPON"; Frontiers of Optoelectronics in China, vol. 2, Issue 4, pp. 384-388, published Apr. 2009. Obtained from: http://rd.springer.com/content/pdf/10.1007%2Fs12200-009-0053-5.pdf.
(Continued)

*Primary Examiner* — Guy Lamarre
(74) *Attorney, Agent, or Firm* — Simon Kahn

(57) ABSTRACT

A method of providing forward error correction on an Ethernet point-to-point link, constituted of: receiving at one end of the point-to-point link an input data stream, wherein the input data stream is a 10 bit symbol encoded serial data stream at a first data rate; decoding the 10 bit encoded data stream to a 9 bit symbol data stream; increasing the data rate of the 9 bit symbol data stream to a second data rate; for each segment of a predetermined number of 9 bit symbols generating a respective plurality of parity symbols; combining the segments and the generated respective plurality of parity symbols into FEC appended segments; encoding the FEC appended segments into an output 10 bit symbol encoded data stream; and transmitting the output 10 bit encoded stream on the point-to-point link at the second data rate.

16 Claims, 7 Drawing Sheets

(51) Int. Cl.
*G06F 11/10* (2006.01)
*H04L 5/00* (2006.01)

(56) References Cited

U.S. PATENT DOCUMENTS

2010/0202509 A1* 8/2010 Thompson ....... H04N 21/23805
375/240.01
2010/0229067 A1 9/2010 Ganga

FOREIGN PATENT DOCUMENTS

| WO | 03/092207 A1 | 11/2003 |
| WO | 2008/058482 A1 | 5/2008 |
| WO | 2010/144264 A1 | 12/2010 |

OTHER PUBLICATIONS

Combined Search and Examination Report for GB131995.5 issued Apr. 28, 2014 by Intellectual Property Office (UK Patent Office).

* cited by examiner

US 9,564,991 B2

ETHERNET POINT TO POINT LINK INCORPORATING FORWARD ERROR CORRECTION

TECHNICAL FIELD

The present invention relates to the provision of forward error correction for an Ethernet point-to-point link

BACKGROUND OF THE INVENTION

Forward error correction (FEC), usually implemented by Reed-Solomon generation of parity symbols, is a desirable features of Ethernet point-to-point links. However, existing protocols for Ethernet point-to-point links, at least those operating at 1 Gb/s, either do not provide FEC or do so in a manner which imposes a degradation of the data rate or a substantial variable latency in the link.

For example, in the ITU-T recommendation G.709 "Interfaces for Optical Transport Network (OTN)" an FEC scheme that operates on OTN frames is defined, where each frame is a fixed size and FEC imposes a data throughput degradation.

IEEE 802.3 Clause 65, which is addressed to a 1 Gigabit per second Ethernet Passive Optical Network (EPON), does include a FEC option but operates for a point to multipoint architecture that forces the Ethernet preamble to be overwritten with a logical link identifier (LLID), mode and start of LLID delimiter (SLD) fields. It forces the media access control (MAC) to implement interpacket gap (IPG) stretching to accommodate the FEC parity symbols and therefore degrades the data throughput by at least 7%. Moreover, it imposes a variable receiver packet latency equivalent to the packet size.

IEEE 802.3 1G 1000 BaseX point to point Ethernet does not include any options for FEC. Data in IEEE 802.3 1G 1000 BaseX point to point Ethernet is typically transmitted as 10 bit symbols encoding 8 bit symbols so as to ensure balance on the transmission medium, in a process known as 8B/10B encoding.

SUMMARY OF THE INVENTION

The present invention employs a method of FEC encoding in which the parity symbols are interspersed in the packet data. For this purpose the packet delimiters may be used as FEC block markers. A preferred form of the invention allows the use of a low latency FEC block The scheme preferably employs rate gearing to avoid degradation of the data throughput. Other features and advantages of the scheme will become apparent after a detailed description of a preferred form of the invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing.

DETAILED DESCRIPTION OF PREFERRED EMBODIMENTS

Figure 1:
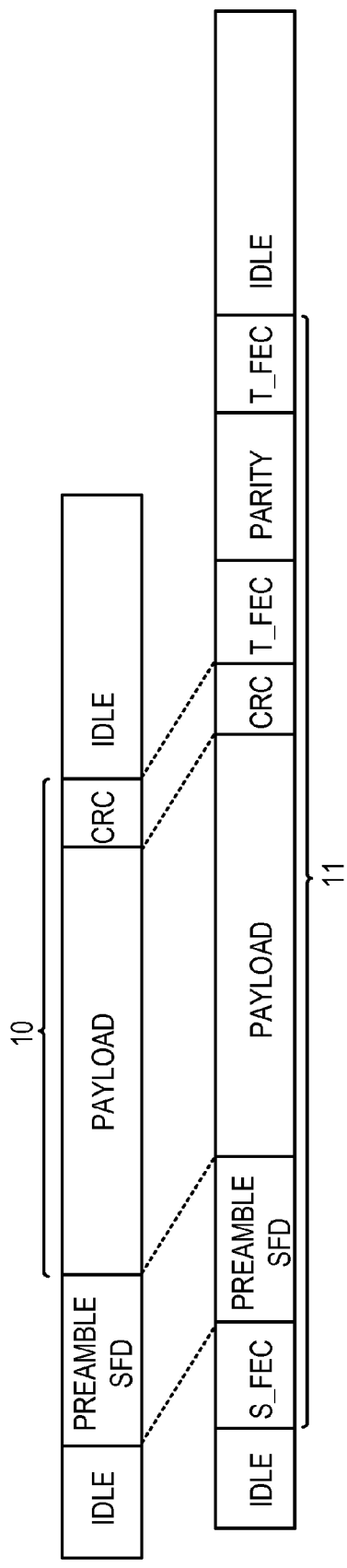
FIG. 1 illustrates a known FEC encoding scheme.

FIG. 1 of the drawings illustrates a scheme for optional FEC encoding known to the prior art. The packet shown at 10 has no FEC encoding whereas the packet shown at 11 includes FEC encoding. Packet 10 is preceded and succeeded by idle bytes, i.e. the IPG. Packet 10 has a preamble and start frame delimiter (SFD) followed by the payload which is followed by a cyclic redundancy code (CRC). In this scheme the maximum packet size is fixed. Packet 11 exhibits a code, denoted S_FEC, which may be a 5-byte code, in front of the preamble. The S_FEC code denotes an environment which is liable to produce a high bit error rate (BER). Packet 11 comprises a parity field which is preceded, and succeeded, by a particular 6-byte code, denoted T_FEC, the combination of which is transmitted during a stretched inter-payload gap. If, for example, the content of packet 11 is encoded by a Reed Solomon (255, 239) scheme using 8-bit symbols, sixteen parity symbols are generated for each 239 symbols in the packet, which packet could have a size up to 10,400 bytes (a jumbo frame packet). It is to be noted that all of the parity symbols of packet 11 are disposed after the packet, and thus a receiver must hold the entire received packet 11 before it sees the parity symbols, and only then can the receiver correct any errors and forward the packet. This incurs a variable latency dependent on the packet size since packet 11 cannot be delivered to the next processing stage until it has been completely received and corrected. In contrast, if the packet is corrected piece by piece (as in the embodiments hereinto below) the corrected portion can be delivered to the next receive processing stage as it is corrected, i.e. piece by piece. This means that the receive latency is reduced from a whole packet time to a piece of a packet time. Both packets 10 and 11 are transmitted as 10 bit symbols over a data transmission medium.

Figure 2:
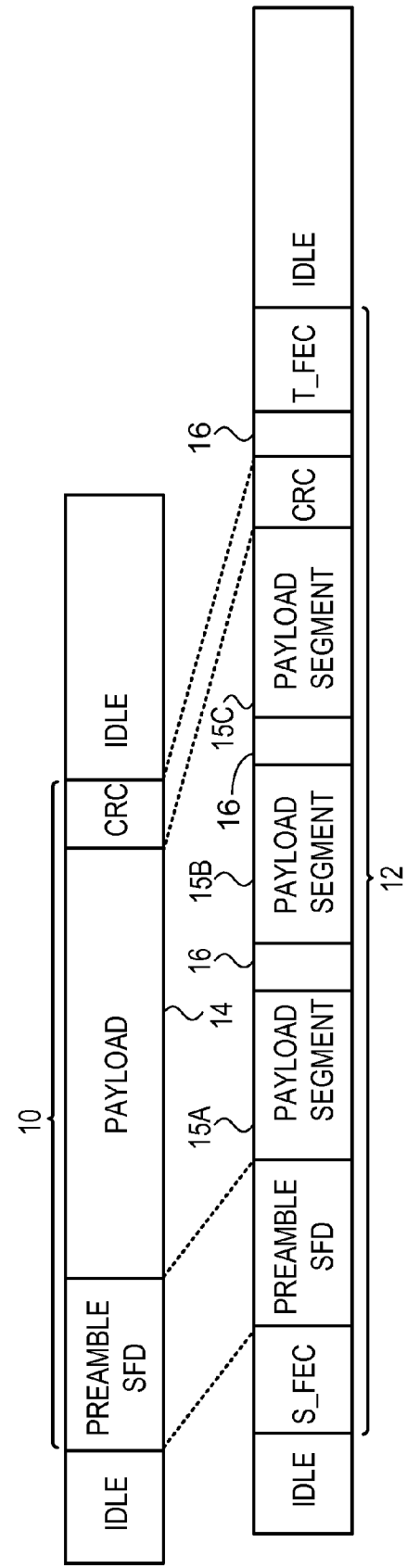
FIG. 2 illustrates a preferred scheme according to an exemplary embodiment.

FIG. 2 illustrates in broad terms a scheme according to an exemplary embodiment, where packet 10 is as described above in relation to FIG. 1 having a payload 14 and a packet 12 is shown in comparison therewith. Packet 12 is shown with FEC encoding, as described above in relation to packet 11, however the parity symbols 16 for each segment, of a predetermined number of symbols in the packet 12, are interspersed within the packet itself. In one embodiment the parity symbol 16 is generated for every 239 symbols. After each of the predetermined number of symbols, or the packet size if it is less than the predetermined number of symbols, a parity symbol 16 is appended. This results in a receive side maximum latency of the predetermined number of symbols, since error detection may be performed on the segment after receipt of the trailing parity symbol 16. The parity is shown as trailing the payload segment 15, however this is not meant to be limiting in any way, and the parity symbol 16 may precede the respective segment without exceeding the scope. In certain embodiments, as will be described further below, payload 14 of packet 10 is broken into multiple payload segments 15A, 15B and 15C, generally payload segment 15. It is to be understood that there is no requirement that the length of each payload segment 15 be of the same length, since the parity occurs for a fixed number of bytes of packet 12, irrespective of their content, and thus the bits of the preceding idle bits, S_FEC, Preamble SFD and those payload segment 15A are counted in the predetermined number of symbols.

Figure 3:
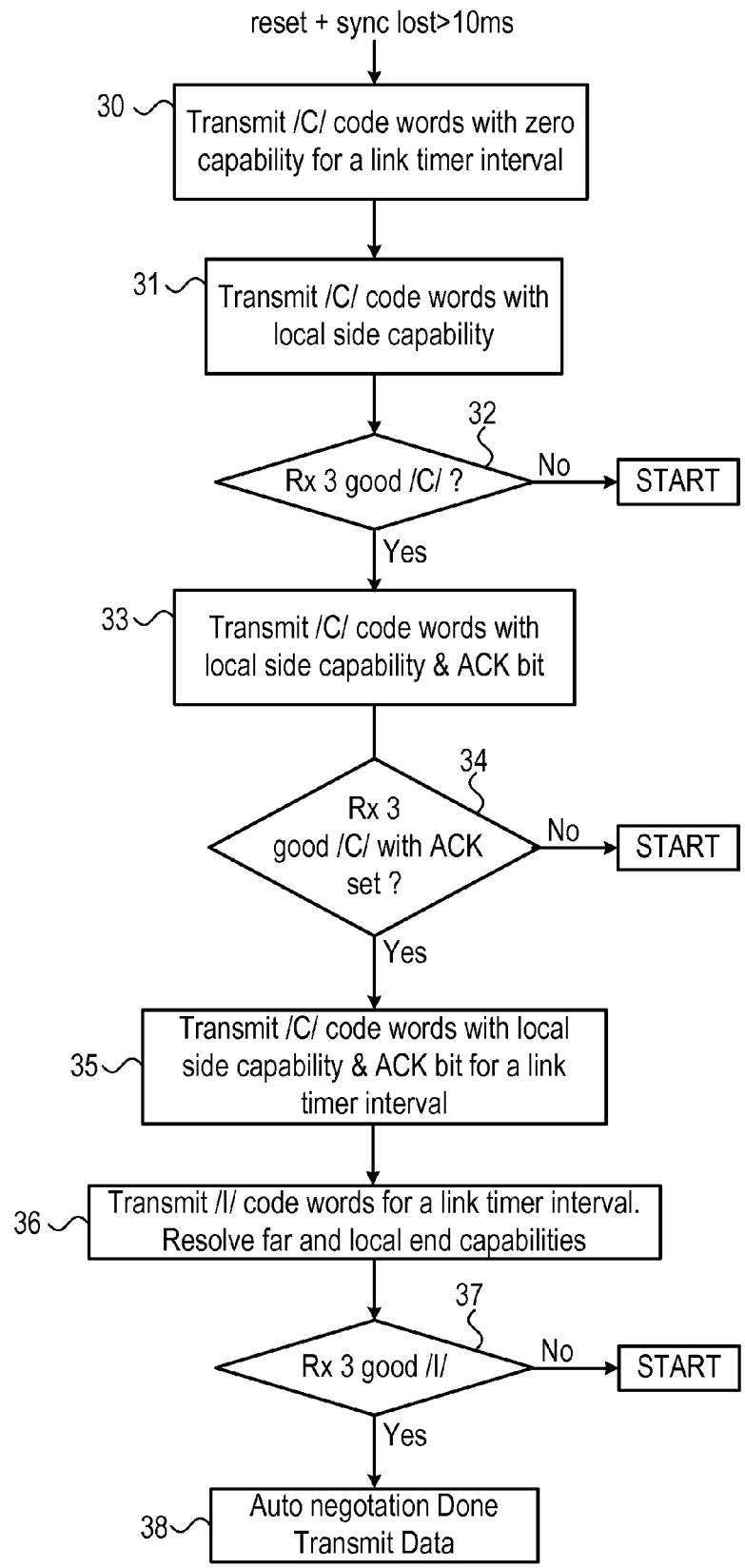
FIG. 3 illustrates for reference an auto-negotiation scheme appropriate for use with the exemplary embodiment of FIG. 2.

Since a scheme according to the exemplary embodiment preferably employs auto-negotiation, so as for example to determine whether both ends of a link are capable of encoding and decoding forward error correction, a typical auto-negotiation process will be described with reference to FIG. 3. The example is auto-negotiation according to IEEE 802.3 clause 37.

The process starts after a reset or when the receive synchronisation state machine indicates SYNC FAIL.

In general, a local side transmits a sequence of code words for durations of time governed by a link timer (typically 10 ms). The transmitted code words advertise the capabilities of the local side e.g. full/half duplex, flow control, speed and are received by a remote end. Each transmitted code word is composed of symbols that have been encoded using 8B/10B encoding rules. There are two code words used in the phases of auto-negotiation—configuration and idle code words.

In stage 30, the local side first transmits configuration code words with a capability field of all zeros for a link timer interval. This allows the remote end to synchronise to data stream.

In stage 31, the local side then starts to transmit configuration code words with a non-zero capability field advertising its abilities. In the event that in stage 32 the local side receives three consecutive good configuration code words from the remote end, in stage 33 the local side transmits code words with the local side capability and asserts an acknowledge bit to the remote end. In the event that the local side does not receive three consecutive configuration code words, auto-negotiation according to the prior art is initiated again.

In the event that in stage 34 the local side receives three consecutive good configuration code words, i.e. error free configuration code words, containing the asserted acknowledge bit of stage 33, in stage 35 the local end continues to transmit the configuration code words to the remote end with the acknowledge bit for a link timer interval. In the event that in stage 34 the local side does not receive three consecutive good configuration code words containing the asserted acknowledge bit of stage 33, auto-negotiation according to the prior art is initiated again.

In stage 36, the local side transmits an IDLE code word for a link timer interval and during this time, resolves the local and remote capabilities responsive to the received configuration code words of stage 34.

In stage 37, in the event that the local side has received three consecutive good IDLE code words at the end of the timer interval, in stage 38 auto-negotiation is complete and the local side sets a register indicating that it can transmit data in accordance with the resolution of stage 36. In the event that in stage 37 the local side has not received three consecutive good IDLE code words at the end of the timer interval auto-negotiation according to the prior art is initiated again.

Figure 4:
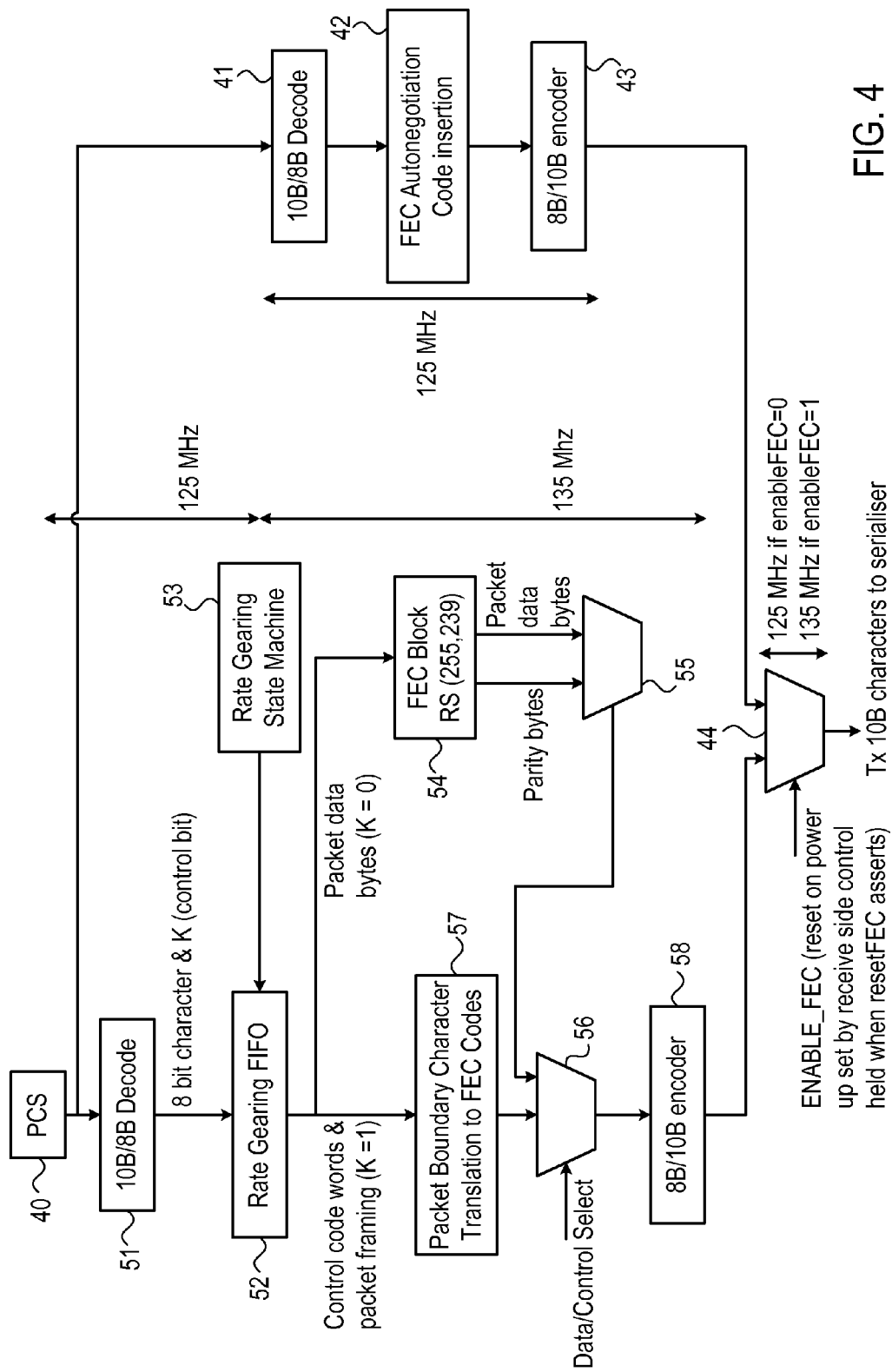
FIG. 4 illustrates one embodiment of an FEC-enabled transmitter according to an exemplary embodiment.
Figure 5:
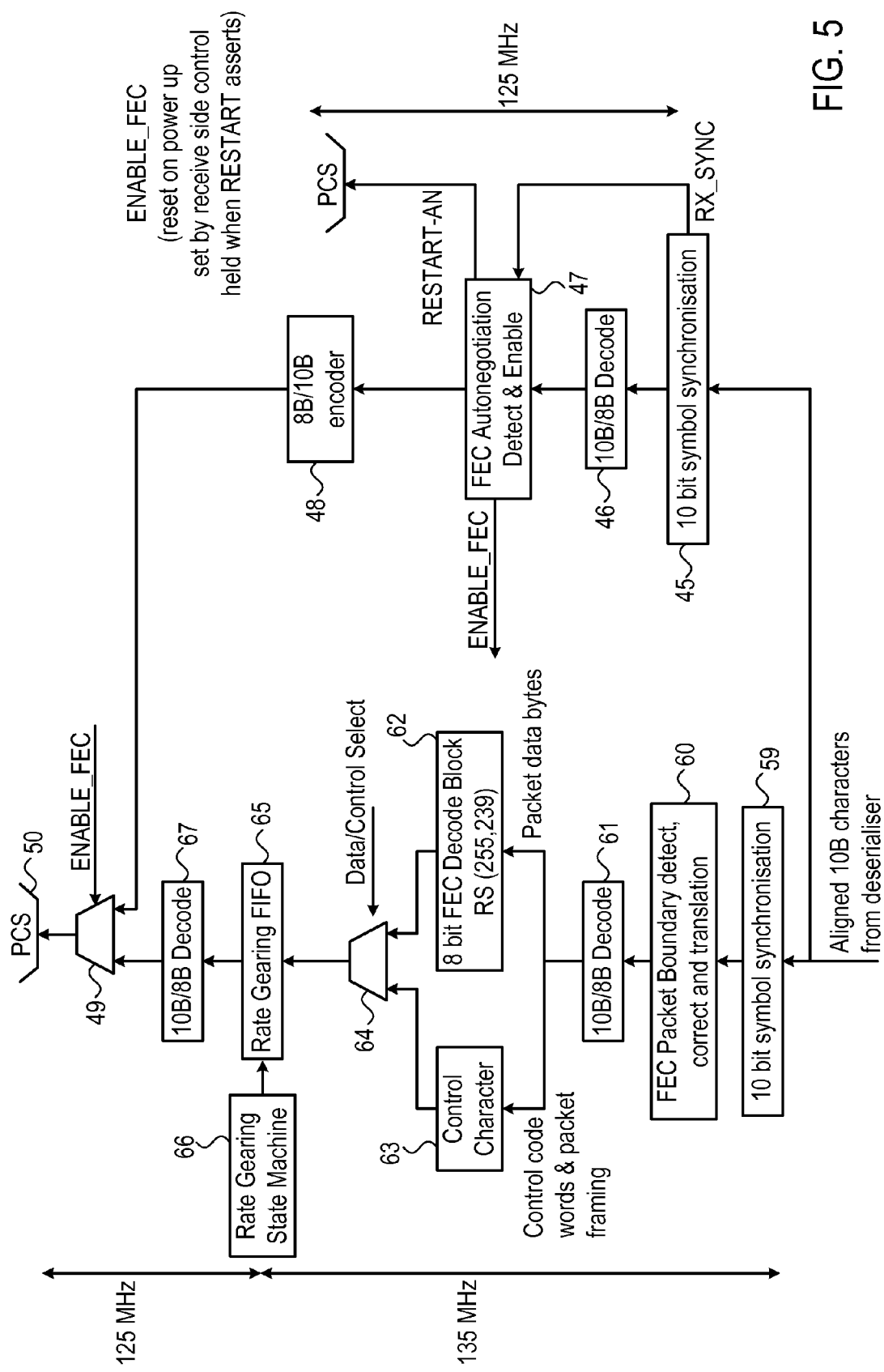
FIG. 5 illustrates one embodiment of an FEC-enabled receiver according to an exemplary embodiment.

FIGS. 4 and 5 show respectively an FEC-enabled transmitter and an FEC-enabled receiver according to exemplary embodiments. Each end of a link will, if capable of forward error encoding and decoding, have both a transmitter according to FIG. 4 and a receiver according to FIG. 5, with one end denoted the local end and one end denoted the remote end.

In this example both ends of the link power up, operating at 1.25 Gb/s and with the FEC initially disabled.

In each of FIGS. 4 and 5, the right-hand path in the figure is arranged to perform auto-negotiation as described above in relation to FIG. 3, and the left-hand path is arranged to handle the sending and receiving of packets. For convenience the auto-negotiation portions will be described first.

The transmitter in a physical coding sublayer (PCS) 40 starts auto-negotiation by sending configuration code words C1 and C2 with a null capability field for a link timer interval of 10 ms as described above in relation to stage 30. This allows the remote end receiver to lock and find symbol synchronisation with local side. The PCS layer 40 configuration code words are received by a 10B/8B decoder 41, which decodes the 10 bit symbols of the configuration code words to 8 bit symbols. The 8 bit symbol decoded configuration code words are received by an FEC auto-negotiation code inserter 42.

Configuration code words are a series of 10B encoded symbols preferably as follows:
{K28.5/D21.5/16 zeros (C1) followed by K28.5/D2/2/16 zeros (C2)} repeated.

Configuration code words C1/C2 are transmitted by PCS 40 with their advertised capabilities {K28.5/D21.5/advertised capability (C1) followed by K28.5/D2.2/advertised capability (C2)} repeated, as described above in stages 31 and 33.

The advertised capability contains bits to indicate capabilities such as speed, flow control, fault handling. The 16 bit quantity (referred to as CONFIG_REG in IEEE 802.3) contains unused bits and in this example one of them is used to carry the FEC capability, the bit then denoted FEC_AN. FEC auto-negotiation code inserter 42 is thus arranged to set an unused bit the configuration code words C1/C2 received from PCS 40. This may be achieved by an overwrite in FEC auto-negotiation code inserter 42 of the FEC_AN bit.

The adjusted configuration code words C1/C2 are then encoded by the 8B/10B encoder 43 and sent by way of a multiplexing gate 44 to a serialiser (not shown) for transmission on the link to the remote end. The FEC_AN bit is detected in the receiver as described below. The choice of the FEC_AN bit can be under software control by providing a mask register that is logically OR'ed with the transmitted field from the PCS layer in the FEC auto-negotiation code inserter 42. Alternatively it can be configured to a fixed position.

In the receiver shown in FIG. 5, aligned 10B characters received from the link by way of a deserialiser (not shown) are coupled to a synchronisation block 45, and the output of synchronisation block 45 is coupled by way of a 10B/8B decoder 46 to an FEC auto-negotiation detect & enable block 47. The output of FEC auto-negotiation detect & enable block 47, which is coupled by way of an 8B/10B encoder 48 and a gate 49 to PCS 50.

The synchronisation block 45 in the receiver waits until it has gained symbol synchronisation and then asserts the signal RX_SYNC to FEC auto-negotiation detect & enable block 47. In the event that the FEC auto-negotiation detect & enable block 47 then detects the FEC_AN bit set in three consecutive good configuration codes, the receiver knows the remote end is FEC capable. FEC auto-negotiation detect & enable block 47 then responsively asserts the signal ENABLE_FEC to gates 49 and 44 (FIG. 4) at the end of the auto-negotiation process to enable the local tx and rx FEC data paths as will be described further below. FEC auto-negotiation detect & enable block 47 also assert symbol RESTART-AN to requests the PCS layer to start auto-negotiation, in accordance with standards based auto-negotiation (.ENABLE_FEC remains asserted until the link is lost, the power is cycled or the device is reset.

In this scheme therefore, the default operation is a non-FEC data path, but with advertisement of FEC capability. If the remote partner supports FEC, the FEC data path is enabled; otherwise the default (non-FEC) data path is maintained.

It is preferred to run the line speed for data transmission between the local end and the remote end at a higher rate than usual to accommodate the FEC symbols and thereby not to degrade the data throughput. To achieve this, the scheme includes rate gearing during both transmit and receive. This rate gearing marginally increases the data rate to enable parity symbol insertion in the transmitter and correspondingly decreases the data rate after error correction in the receiver. In the specific example, the original data rate of the packets from the PCS 40 is 1.25 Gb/s (i.e. 125 MHz) and is increased to (nominally) 1.35 Gb/s (i.e. 135 MHz) in the transmitter and decreased back to 1.25 Gb/s in the receiver.

Not shown in FIG. 4, since they may be of known configuration, are a MAC layer and a Reconciliation Sublayer (RS) which precede the PCS on transmit (and vice versa on receive). These output a GMII signal comprising an 8-bit character TX_D[7:0] and a TX_EN signal. The signal TX_EN is asserted low during inter-packet gaps and high for packets. The PCS layer detects transitions in the TX_EN signal to determine packet boundaries. It can then determine when to drive the control variable as a D or a K into the encoder. It drives the control variable as a K for start of frame, end of frame and IPG control words, and as a D for data packet bytes, including the preamble of the data packet.

The data path of the transmitter as shown in FIG. 4 includes a 10B/8B decoder 51.

The 8B/10B transmission code has a high transition density, is a run-length-limited code, and is dc-balanced. The transition density of the 8B/10B symbols ranges from 3 to 8 transitions per symbol and allows clock recovery at the receiver to take place.

8B/10B encoders take an 8 bit character and a control variable as inputs and generate a 10 bit output. Decoders operate conversely. The control variable has either the value D or K. As noted above, when it contains the D value, the corresponding 8 bit character is a data character and the encoder encodes as a data code-group. When the control variable contains a K value, the corresponding 8-bit character is a control character and the encoder encodes as a special code group. Special code groups are used in start-of-frame, end-of-frame, IDLE and configuration code words.

The output of PCS 40 of the transmitter is further received by a 10B/8B decoder 51, and the output of 10B/8B decoder 51 is received by a rate-gearing FIFO 52 controlled by a rate-gearing state machine 53. The output of rate-gearing FIFO 52 is fed to an FEC block 54. This block generates for each predetermined size segment of the packet (e.g. 239 symbols) a respective set of parity symbols (e.g. 16 symbols). Thus the latency introduced by enabling FEC is limited to one FEC block, i.e. n symbols where the coding is {n, k} using a symbol width w, k parity symbols for each n data symbols In this example n=239 and k=16 and w=8, so the latency is limited to 239 bytes.

Both packet data and the generated parity symbols of FEC block 54 pass through a sequencing gate 55 to a combining gate 56. Sequencing gate 55 acts to place the generated parity symbols of FEC block 54 in a predetermined location in the data stream in relation to the packet data. In one non-limiting embodiment the parity symbols are placed immediately subsequent to the data symbols from which they are generated. Control code words and packet framing codes are translated to FEC codes in a packet boundary character translation block 57 and these codes additionally proceed to combining gate 56. The output of combining gate 56 is encoded by an 8B/10B encoder 58 and is coupled to an input of multiplexing gate 44. The output of the multiplexing gate 44 is sent to the serialiser (not shown) for transmission on the link, as described above. Control of multiplexing gate is responsive to signal ENABLE_FEC output by FEC Auto-negotiation detect & enable block 47.

On transmit, FEC block 54 flow controls the data stream when it generates parity symbols. During that time, the rate gearing FIFO 52 stores any incoming symbols from the PCS 40. The FIFO 52 has a fill rate of 1.25 Gb/s and an empty rate of (nominally) 1.35 Gb/s. A low latency FEC scheme is preferred so that the flow control is generated only at the end of each block code, i.e. the predetermined size segment of the packet. There must therefore be at least enough space in the rate gearing FIFO 52 equivalent to 16 parity symbols at the higher rate of 1.35 Gb/s.

In this specific case, 16 symbols at 135 MHz=14.8 symbols at 125 MHz so a minimum space of 15 symbols is required.

However, there is also an added practical consideration. There may be periods of time during which no packets are transmitted and only IPGs consisting of IDLE code words are sent. There is no requirement for FEC encoding for any IPG bytes, so no flow control is invoked. However, the rate gearing state machine 53 preferably monitors the depth of rate gearing FIFO 52 to ensure that an underrun does not occur, where the emptying rate being higher than the filling rate. To prevent such an underrun, rate gearing FIFO 52 inserts IDLE characters into the data stream as required, responsive to a command from rate gearing state machine 53.

On the receive side, an FEC decoder block 62 sends corrected blocks of packet data to a rate gearing FIFO 65 during packet reception. After a corrected block of packet data is sent there can be a gap before the next corrected block of packet data is sent, as the parity symbols are deleted from the data stream. The rate gearing FIFO 65 has a fill rate of (nominally) 1.35 Gb/s and an empty rate of 1.25 Gb/s. A rate gearing state machine 66 thus monitors the depth of rate gearing FIFO 65 and determines an appropriate space to start emptying rate gearing FIFO 65. Advantageously, such an operation prevents false detection of an underrun by PCS 50. This space is (for the particular rates chosen) 15 symbols as indicated above.

Similar to the transmit case, there may be periods of time during which no packets are transmitted and only IPGs consisting of IDLE code words are received. There is no requirement for FEC encoding for any IPG bytes so gaps may be present on the filling side of rate gearing FIFO 65. Rate gearing state machine 66 thus preferably monitors the depth of rate gearing FIFO 65 to ensure that an overrun does not occur as the emptying rate is lower than the filling rate, and will preferably delete IDLE characters from the data stream to prevent such an underrun.

In the scheme illustrated in FIGS. 4 and 5, FEC is applied only to the packet data in the succession of segments in the data stream, i.e. not to any control characters or codes, however this is not meant to be limiting in any way. As will be explained below, a simpler embodiment employs FEC coding for the entire data stream, i.e. the packets, IPGs and any transmitted control characters.

The FEC scheme described with reference to FIGS. 4 and 5 is illustrated with an RS (255,239) encoder with a symbol width of 8 bits. This generally satisfactory but has two practical disadvantages in relation to shortened codes, wherein a block size of fewer than 239 symbols is encoded. This can occur when a packet having fewer than 239 bytes is transferred. For example, if a packet of 64 bytes is transferred then using the scheme of FIGS. 4 and 5, 16 parity symbols would be appended to the 64 bytes in a shortened code word. A first disadvantage is that the overhead increases from a nominal 7% to 25% (in this example), requiring a higher line rate. A second disadvantage is a probable decrease in effective throughput. FEC decoders generally have a processing delay that is dependent on the block size. This affects the ability of the decoder to accept continuously consecutive blocks and therefore the effective rate of throughput. If shortened codes (such as 64 bytes) are handled by a 239-byte block, the effective throughput falls dramatically. It is possible to employ parallel decoders but at the cost of an increased gate count.

Figure 6:
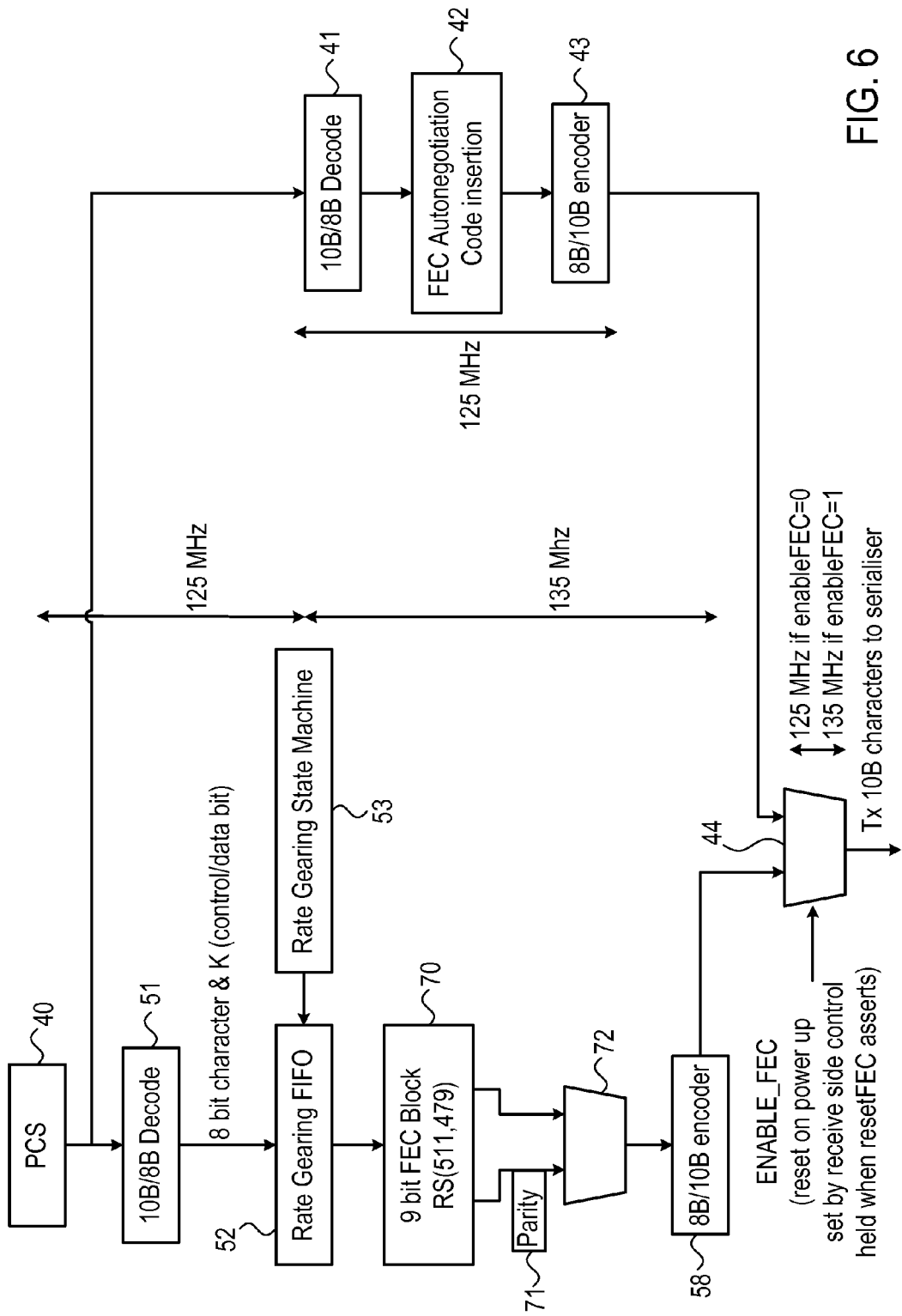
FIG. 6 illustrates another embodiment of an FEC enabled transmitter according to an exemplary embodiment.
Figure 7:
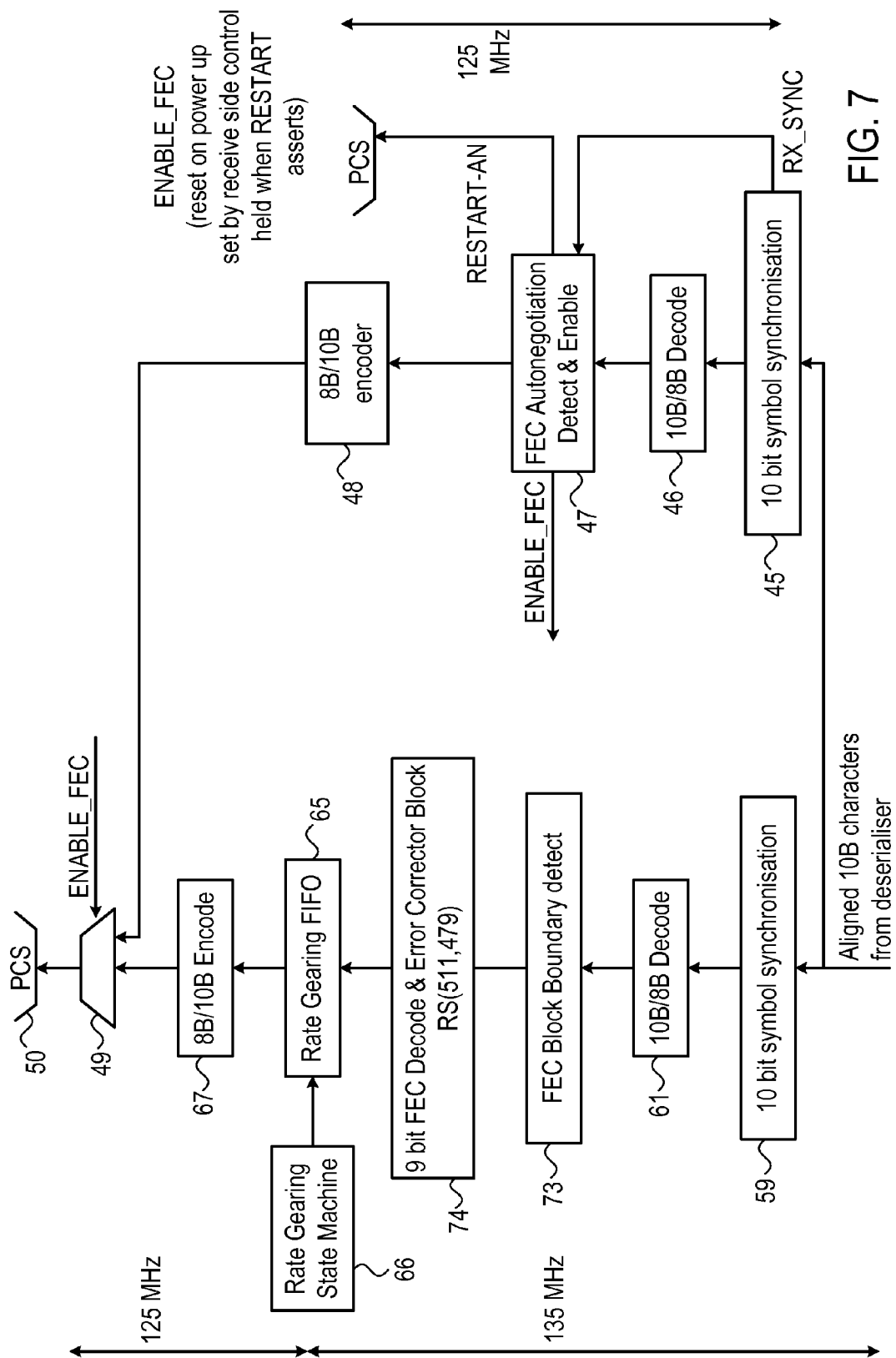
FIG. 7 illustrates another embodiment of an FEC-enabled receiver according to an exemplary embodiment.

FIGS. 6 and 7 illustrate an alternative scheme which does not use shortened codes, but uses a larger 9-bit encoder/decoder system based on RS (511,479) with a symbols width of 9 bits. Moreover, as indicated above, it encodes all of the data stream including IPG and the control characters.

FIG. 6 shows a transmitter according to this modified scheme. It generally resembles the transmitter shown in FIG. 4 and parts having the same reference numerals are the same. The auto-negotiation path is the same as before.

The input to the rate gearing FIFO 52 comprises 8 bit characters each with a control/data bit K. Since each symbol is now 9 bits wide, the FIFO feeds a 9-bit FEC block 70. In a non-limiting example, FEC block 70 employs an RS (511, 479) coding. The data received from rate gearing FIFO 52 and the parity symbols (71) generated by FEC block 70 are gated in an sequencing gate 72 and are output to an 8B/10B encoder 58.

As in the transmitter of FIG. 4, preferably rate gearing state machine 53 control rate gearing FIFO 52 so as to ensure that rate gearing FIFO 52 never underruns, which is potentially possible because the fill rate is 125 MHZ and the emptying rate is (nominally) 135 MHz. Thus, in the particular embodiment illustrated, for every 479 symbols written into rate gearing FIFO 52, 479 symbols are read out and 32 symbols of stall occur on the 135 MHz side.

Numerically, 479 symbols at 125 MHz occupy 3832 ns. 479 symbols and 32 stall cycles at 135 MHz occupy 3785 ns, so the underruns over each 479-symbol block equals 47 ns, corresponding to 7 symbols at 135 MHz. Since IDLEs may be inserted only during interpacket gaps, and a jumbo frame may be 10,400 bytes (22×479 blocks), rate gearing FIFO 52 preferably remains above 154 symbols (7×22) at all times to prevent an underrun.

Similar calculations may be used if the higher rate is different form 135 MHz. For example, if the reading side operated at 133.5 MHz, the minimum occupancy of rate gearing FIFO 52 would be only 0.5 symbols per 479-symbol block, i.e. 11 symbols, so rate gearing FIFO 52 would need fewer gates.

FIG. 7 shows a receiver which generally resembles the receiver shown in FIG. 5. However, in place of the elements 62-64 are a FEC boundary detect block 73 and a 9-bit FEC decode block 74.

Figure 8:
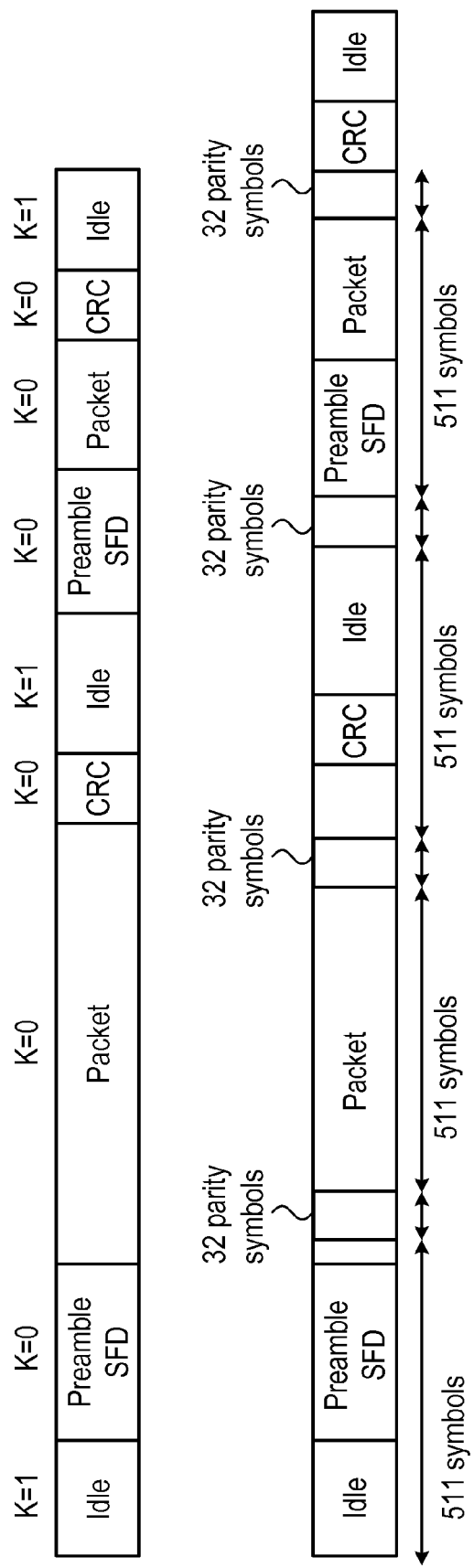
FIG. 8 illustrates a preferred format of packets according to an exemplary embodiment.

FIG. 8 shows the packet structures for a packet stream 80 without FEC enabled and a packet stream 81 which has FEC enabled.

The schemes as described above have several important advantages. They provide a low latency FEC block operating within packet boundaries within an Ethernet data stream. They use rate gearing on transmit and receive to ensure the data throughput is not degraded.

The auto-negotiation process enables FEC on both ends of the link while maintaining backwards capability with legacy 1000BaseX auto-negotiation. This can be achieved without any need to overwrite any preamble fields.

The schemes can be implemented on line card 1G connections.

The schemes can be implemented in optical SFP for easy upgrade for higher BER.

The schemes can be coupled with Ethernet CFM for visibility into SLA error statistics and connectivity checking.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

The invention claimed is:

1. A method of providing forward error correction (FEC) on an Ethernet point-to-point link, comprising:
   receiving at one end of the point-to-point link an input data stream, wherein said input data stream is a 10 bit symbol encoded serial data stream, comprising data packets, at a first data rate;
   decoding said 10 bit encoded data stream to a 9 bit symbol data stream;
   increasing the data rate of said 9 bit symbol data stream to a second data rate;
   for each segment, constituted of a predetermined number of 9 bit symbols of said 9 bit symbol data stream, generating a respective plurality of parity symbols for the 9 bit symbol data of the segment, wherein each data packet comprises a plurality of segments;
   combining the segments and the generated respective plurality of parity symbols into FEC appended segments, each of said FEC appended segments composed of the 9 bit symbols of the respective segment and the respective generated plurality of parity symbols;

encoding said FEC appended segments into an output 10 bit symbol encoded data stream; and transmitting the output 10 bit encoded stream on the point-to-point link at said second data rate.

2. The method according to claim 1 in which rate-changing FIFOs are employed for the increasing and decreasing of the data rate.

3. The method according to claim 1, wherein said 9 bit symbol data of said 9 bit symbol data stream comprises an 8 bit character and a control character.

4. The method according to claim 1, further comprising:
receiving, at a second end of the point-to-point link, the output 10 bit encoded stream at the second data rate;
decoding said received 10 bit encoded data stream to a 9 bit symbol received data stream;
for each FEC appended segment of said 9 bit symbol received data stream employing the plurality of parity symbols to correct errors in the respective segment; and
decreasing the data rate of the corrected 9 bit symbol data stream to the first data rate, and
encoding the corrected 9 bit symbol data stream to a 10 bit symbol encoded data stream.

5. The method according to claim 4, further comprising detecting the boundary of each FEC appended segment of said 9 bit symbol received data stream.

6. The method according to claim 4 further comprising auto-negotiation between the first end of the link and the second end of the link, wherein said increasing of the data rate, generating parity symbols and combining of the segments into FEC appended segments are only performed after a successful auto-negotiation is indicative that both the first end of the link and the second end of the link are forward error correction capable for the point-to-point link.

7. The method according to claim 6 in which the auto-negotiation includes the overwrite of an otherwise unused bit in a configuration code to indicate capability of forward error correction.

8. The method according to claim 1, wherein the second data rate is selected such that the duration of each FEC appended segment of the output 10 bit encoded stream at the second data rate is substantially the same as the duration of the respective segment, without said generated respective plurality of parity symbols, of the input 10 bit data stream at the first rate.

9. A link transceiver arranged to provide forward error correction on an Ethernet point-to-point link, said link transceiver arranged to receive an input data stream comprising data packets, wherein said input data stream is a 10 bit symbol encoded serial data stream at a first data rate, the transceiver comprising a transmitter, said transmitter comprising:
a decoder arranged to decode the said 10 bit encoded data stream to a 9 bit symbol data stream;
a first rate gearing FIFO arranged to receive the output of said decoder and increase the data rate of said 9 bit symbol data stream to a second data rate at the output of said FIFO;
a parity symbol generator arranged to generate, for each segment of a predetermined number of 9 bit symbols of said 9 bit symbol data stream output from said FIFO a respective plurality of parity symbols for the 9 bit symbol data of the segment, wherein each data packet comprises a plurality of segments;
a gate arranged to combine the segments and the generated respective plurality of parity symbols into FEC appended segments, each of said FEC appended segments composed of the 9 bit symbols of the respective segment and the respective generated plurality of parity symbols;
a first encoder arranged to encode said FEC appended segments into an output 10 bit symbol encoded data stream; and
a transmitter arranged to transmit the output 10 bit encoded stream on to a first end of the point-to-point link at said second data rate.

10. The transceiver according to claim 9, wherein said 9 bit symbol data of said 9 bit symbol data stream comprises an 8 bit character and a control character.

11. The transceiver according to claim 9, further comprising an auto-negotiation functionality arranged to determine whether a receiver of the link transceiver at a second end of the point-to-point link is capable of forward error correction, the transmitter arranged to bypass said:
rate gearing FIFO;
parity symbol generator; and
gate,
in the event that the receiver is not capable of forward error correction.

12. The transceiver according to claim 11 in which the auto-negotiation functionality is arranged to overwrite an otherwise unused bit in a configuration code to indicate capability of forward error correction.

13. The transceiver according to claim 9 wherein the parity symbol generator employs Reed Solomon encoding.

14. The transceiver according to claim 9 wherein the second data rate is selected such that the duration of each FEC appended segment of the output 10 bit encoded stream at the second data rate is substantially the same as the duration of the respective segment of the input data stream at the first data rate.

15. The transceiver according to claim 9, further comprising a receiver arranged to receive the transmitted output 10 bit encoded stream from a second transceiver at a second end of the point-to-point link, said receiver comprising:
a decoder arranged to decode the received 10 bit encoded data stream to a 9 bit symbol received data stream;
an error corrector arranged to employ the plurality of parity symbols in each segment of the 9 bit symbol received data to correct errors in the respective segment;
a second rate gearing FIFO arrange to receive the corrected 9 bit symbol received data at the second data rate and decrease the data rate to the first data rate at the output of said second rate gearing FIFO.

16. The transceiver according to claim 15, wherein said receiver further comprises a second encoder arranged to arranged to encode said corrected 9 bit symbol received data at the output of said second FIFO into an output 10 bit symbol encoded error corrected data stream.

* * * * *